US012230240B2

(12) United States Patent
Ouisse et al.

(10) Patent No.: US 12,230,240 B2
(45) Date of Patent: Feb. 18, 2025

(54) METHOD AND DEVICE FOR CONTROLLING THE PROPAGATION OF ACOUSTIC WAVES ON A WALL

(71) Applicants: CENTRE NATIONAL DE LA RECHERCHE SCIENTIFIQUE, Paris (FR); ECOLE NATIONALE SUPERIEURE DE MECANIQUE ET DES MICROTECHNIQUES (ENSMM), Besançon (FR); UNIVERSITE DE FRANCHE-COMTE, Besançon (FR)

(72) Inventors: Morvan Ouisse, Besançon (FR); Manuel Collet, Tassin (FR); Gaël Matten, Besançon (FR)

(73) Assignees: CENTRE NATIONAL DE LA RECHERCHE SCIENTIFIQUE, Paris (FR); ECOLE NATIONALE SUPERIEURE DE MECANIQUE ET DES MICROTECHNIQUES (ENSMM), Besançon (FR); UNIVERSITE DE FRANCHE-COMTE, Besançon (FR)

( * ) Notice: Subject to any disclaimer, the term of this patent is extended or adjusted under 35 U.S.C. 154(b) by 140 days.

(21) Appl. No.: 17/757,057

(22) PCT Filed: Dec. 11, 2020

(86) PCT No.: PCT/EP2020/085832
§ 371 (c)(1),
(2) Date: Jun. 8, 2022

(87) PCT Pub. No.: WO2021/122394
PCT Pub. Date: Jun. 24, 2021

(65) Prior Publication Data

US 2023/0026230 A1 Jan. 26, 2023

(30) Foreign Application Priority Data

Dec. 16, 2019 (FR) ...................................... 1914484

(51) Int. Cl.
*G10K 11/175* (2006.01)
*G10K 11/02* (2006.01)
(Continued)

(52) U.S. Cl.
CPC ............. *G10K 11/02* (2013.01); *H04R 1/403* (2013.01); *H04R 1/406* (2013.01); *H04R 3/002* (2013.01);
(Continued)

(58) Field of Classification Search
CPC ........ H04R 1/402; H04R 1/406; H04R 3/002; H04R 29/002; G10K 11/02; G10K 11/175
See application file for complete search history.

(56) References Cited

U.S. PATENT DOCUMENTS 5,498,127 A * 3/1996 Kraft ...................... F02C 7/045
60/725

FOREIGN PATENT DOCUMENTS

WO 9703536 A1 1/1997
WO 2016083970 A1 6/2016
(Continued)

OTHER PUBLICATIONS

French Search Report received for Application No. 1914484, dated Aug. 18, 2020.
(Continued)

*Primary Examiner* — Ping Lee
(74) *Attorney, Agent, or Firm* — Greer, Burns & Crain, Ltd

(57) ABSTRACT

A method and a device for controlling the propagation of acoustic waves in the vicinity of a wall, the method and
(Continued)

device implementing a master device for controlling a set Nc of cells primarily made up of a speaker, a set of Nm microphones connected to the speaker, and a control unit, by means of control laws that determine the intensity of the electrical signal that must be sent to each speaker so as to obtain a target determined generalized acoustic impedance for each speaker, such that a fraction of the acoustic waves is absorbed by the membrane of each speaker.

9 Claims, 2 Drawing Sheets

(51) Int. Cl.

| | |
|---|---|
| ***H04R 1/40*** | (2006.01) |
| ***H04R 3/00*** | (2006.01) |
| ***H04R 3/12*** | (2006.01) |
| ***H04R 29/00*** | (2006.01) |

(52) U.S. Cl.
CPC ............... *H04R 3/005* (2013.01); *H04R 3/12* (2013.01); *H04R 29/002* (2013.01)

(56) References Cited

FOREIGN PATENT DOCUMENTS

| | | |
|---|---|---|
| WO | 2016083971 A1 | 6/2016 |
| WO | 2019182244 A1 | 9/2019 |

OTHER PUBLICATIONS

International Search Report and Written Opinion received for PCT/EP2020/085832, mailed Mar. 12, 2021.

Liu, F., et al., "Acoustic energy harvesting using an electromechanical Helmholtz resonator," J. Acoust. Sco. Am 123, No. 4, Apr. 2008, pp. 1983-1990.

* cited by examiner

[Fig. 1]
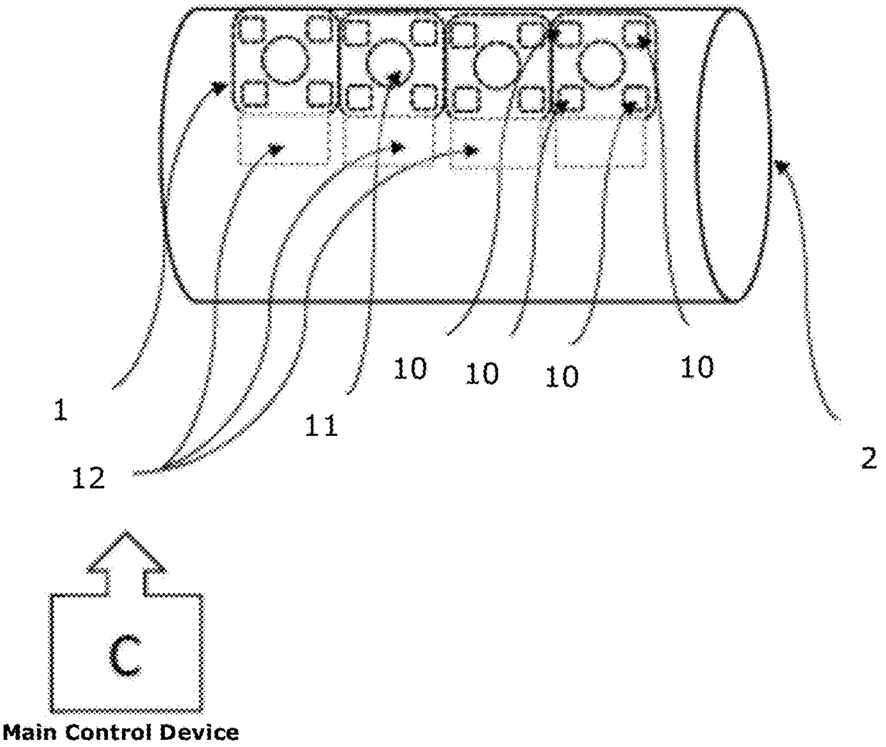
[Fig. 2]
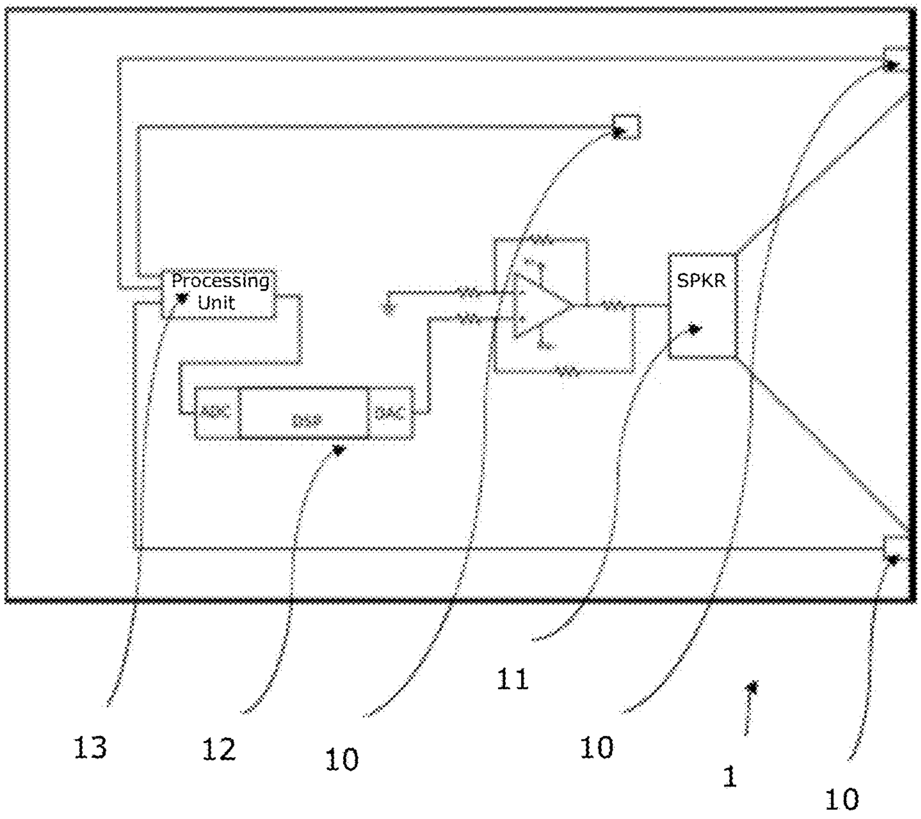

METHOD AND DEVICE FOR CONTROLLING THE PROPAGATION OF ACOUSTIC WAVES ON A WALL

BACKGROUND

The present invention relates to a method and a device for controlling the propagation of the acoustic waves in the vicinity of a wall.

Reducing noise disturbance due to transport and human activity has become a major challenge. The use of passive coatings in buildings or vehicles has made it possible to limit the acoustic signature of aircraft, but does not allow adaptation to the flight conditions and does not have a significant effect over a wide frequency band.

The techniques used for acoustic treatment are generally based on the use of absorbent materials of the foam type or architected honeycomb materials.

Thus, for certain applications in construction or transport, acoustic liners having distributed Helmholtz resonators are used at low frequencies and foam at high frequencies.

The reduction obtained remains less than a few decibels at low frequencies.

The effectiveness of the conventional absorbent treatments is linked to the thickness of the materials, and is therefore constrained by the bulk and the addition of weight, not to mention the problems of absorption of water and pollutants into these porous materials.

All these techniques are passive and do not have the capacity for adaptation or selective treatment of noise.

Nor are they capable of directing the emissions.

Active noise control techniques have been developed since the 1980s in response to these technological challenges, and the applications relate to fields as varied as consumer audio or transport, but relying on non-distributed strategies.

The problems of bulk and effectiveness at low frequencies of the acoustic treatment systems result in their limited effectiveness for many potential applications.

SUMMARY

For this reason, it has been found necessary to develop new solutions making it possible in particular to treat the problems of wide frequency bands.

The technique deployed makes it possible, within a thickness reduced to a few centimetres, to ensure efficient absorption of acoustic disturbance for complex waves (oblique or diffuse for example) and for a wide range of frequencies including the low frequencies where passive treatments are ineffective.

To this end, the invention proposes to implement a method and a device making it possible to control, locally and non-locally, in an adaptive manner, the generalized acoustic impedance of a wall.

It is noted that acoustic impedance is a habitual known physical variable that corresponds to the ratio between acoustic pressure and acoustic velocity.

The device is constituted by a first stratum of acoustic transducers, each constituted by microphones and a speaker. A second stratum is formed by the electronic part for signal conditioning and real-time command/control.

The device is cellular, each cell incorporating a speaker, microphones, as well as the electronics for computation and signal management.

With respect to the method, each cell is independent and executes a control law the parameters of which can be determined and updated by an integrated interface. It makes it possible to manage the matrix of cells and to access the inputs and outputs of the system as a whole.

Similarly, supplying power to the device is encompassed via all of the elements. The invention concerns more specifically the distributed and modulable character of the system.

The invention relates in particular to a method for controlling the propagation of the acoustic waves in the vicinity of a wall, the method comprising:

- a step a) in which a number Nc of cells constituted mainly by a speaker linked to a set of Nm microphones is affixed on the wall, said microphones and speaker being provided to be driven by a control unit,
- a step b) in which each microphone of each cell measures the acoustic pressure of the acoustic waves. each measurement being returned to the cell control unit,
- a step c) in which the control unit estimates the acoustic pressure and/or its spatial derivative at the level of the speaker, then defines the control law that sets the amperage of the electric current that must be sent to the speaker so as to obtain a determined generalized acoustic impedance $Z_{det}$ for the speaker,
- a step d) in which the control unit sends the electrical signal to the speaker, so that a fraction of the acoustic waves is absorbed by the membrane of the speaker.

According to the invention, in step c) the control unit estimates either the acoustic pressure at the level of the speaker, or its spatial derivative, or both.

Use of the spatial derivatives of the pressure advantageously makes it possible to take account of the rates of variation of the pressure field on the acoustic treatment wall and to take account of the effective velocities of propagation of the noise through the wall.

A main control device drives all of the control units, using a learning loop so as to adjust the determined generalized acoustic impedance $Z_{det}$ for each cell.

Thus, following an iterative process for each cell, the parameters of the control law are adapted while the value of the insertion loss is less than a predetermined threshold, then when the threshold is reached, step c) of claim 1 is carried out, which applies the appropriate control law (defined by adaptation of the parameters) with the aim of obtaining the determined (i.e. targeted) generalized acoustic impedance $Z_{det}$ for the speaker.

Of course, following an iterative process for each cell, it is also possible to adapt the parameters of the control law while the value of a reference physical variable, other than the insertion loss (for example the transmission loss, an absorption coefficient or a target impedance), is sufficiently close to a predetermined value.

Optional characteristics of the invention, whether additional or by substitution, will be given hereinafter.

According to certain characteristics, the loop includes the following steps:

BEGIN: start

A1: loading a generic acoustic model

A2: assigning a control law to at least one of the cells

A3: calculating the parameters associated with the control law

A4: applying the control law to the cell

A5: generating a calibrated signal (white noise or sine sweep for example)

A6: acquiring the signal by the microphones

A7: calculating the insertion loss (IL)

A8: comparing the insertion loss (IL) with a predetermined insertion loss value IL0 corresponding to obtaining the desired generalized acoustic impedance $Z_{det}$ A9: return to A3 for adaptation of the parameters of the control law in order to minimize the error on the measured impedance, in the event that IL<IL0.

According to other characteristics, each cell includes between 3 and 5 microphones, preferably 4.

According to yet further characteristics, the fraction of the acoustic waves absorbed by the membrane of the speaker is converted into electrical energy in order to supply all of the cells.

According to yet further characteristics, the generalized acoustic impedance is modified by means of the control law defined as follows:

The desired dynamics of the current amperage (i) is expressed with respect to the acoustic pressure (p) and its gradient (grad(p)), in the form of a summation of infinite impulse response (IIR) filters, the dynamics of which is materialized by two transfer functions $H_{loc}$ and $H_{dis}$:

[Math 1]

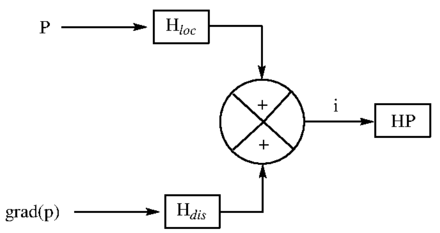

With $H_{loc}$ and $H_{dis}$ written in discrete time as a polynomial fraction in z:

$$H(z) = \frac{a_0 + a_1 z^{-1} + \ldots + a_n z^{-n}}{b_0 + b_1 z^{-1} + \ldots + b_m z^{-m}} \quad \text{[Math 2]}$$

With ($a_i$, $b_i$) the real coefficients of the equation and (m, n) the integers corresponding to the filter order.

Given that the property according to which $z^{-1}$ is a pure delay of a sampling period produces the recurrent control equation between an output at the moment k ($y_k$) and an input at the moment k ($x_k$):

$$y_k = \frac{1}{a_0}\left[\sum_{i=1}^{m} b_i \cdot x_{k-i} - \sum_{j=1}^{n} a_j \cdot y_{k-j}\right] \quad \text{[Math 3]}$$

Given that the current driving signal in the coil of the speaker depends on the pressure and on its gradient, the complete control equation is written as the summation of two recurrent equations of the precedent form: $y_{tot}=y_{loc}+y_{dis}$.

With $y_{loc}$ dependent on the measured pressure and $y_{dis}$ dependent on the estimated pressure gradient.

Thus, the method consists of imposing on the system a physical dynamic when only the measurement of the physical state of the system (pressure, and/or pressure gradient in the vicinity of the membrane of the speaker) is known.

The method therefore does not require the use of a theoretical model of the behaviour of the technological components (for example the speaker).

According to yet further characteristics, the control unit is a microcontroller, preferably of the ARM type. This type of microcontroller is based on a 32-bit (ARMv1 to ARMv7) and 64-bit (ARMv8) RISC type external architecture, developed by ARM Ltd since 1983 and introduced from 1990 by Acorn Computers.

According to yet further characteristics, the control law is defined at a frequency comprised between 25 and 150 kHz.

The invention further relates to a device for controlling the propagation of the acoustic waves in the vicinity of a wall, characterized in that it comprises a number Nc of cells mainly constituted by a speaker, a set of Nm microphones linked to said speaker, a control unit, and a power supply, said microphones and speaker being provided to be driven by said control unit, a fraction of the acoustic waves absorbed by the membrane of the speaker being converted into electrical energy to supply the set Nc of cells, each microphone of each cell being capable of measuring the acoustic pressure of the acoustic waves, each measurement being returned to the cell control unit, the control unit being capable of estimating the acoustic pressure and/or its tangential spatial derivatives at the level of the speaker, and capable of applying the control law that sets the amperage of the electrical signal that must be sent to the speaker so as to obtain a determined generalized acoustic impedance $Z_{det}$ for the speaker, the device also including a main control device for driving the set of control units in a loop including the following steps:

BEGIN: start

A1: loading a generic acoustic model

A2: assigning a control law to at least one of the cells

A3: calculating the parameters associated with the control law

A4: applying the control law to the cell

A5: generating a calibrated signal (white noise or sine sweep for example)

A6: acquiring the signal by the microphones

A7: calculating the insertion loss (IL)

A8: comparing the insertion loss (IL) with a predetermined insertion loss value IL0 corresponding to obtaining the desired generalized acoustic impedance $Z_{det}$ A9: return to A3 for adaptation of the parameters of the control law in order to minimize the error on the measured impedance, in the event that IL<IL0.

Optional characteristics of the invention, whether additional or by substitution, are given hereinafter.

According to certain characteristics, each cell of the device includes between 3 and 5 microphones, preferably 4.

Similarly, supplying power to the device is encompassed via all of the elements. The invention concerns more specifically the distributed and modulable character of the distributed system.

The distributed character of the microphones makes it possible to reconstruct spatial derivatives and to measure a pressure field in real time.

The distributed character of the actuators makes it possible to have a control law that is variable in space.

The distributed character of the control units makes it possible to have a high level of robustness (the system can function in degraded mode, even with several malfunctioning elements).

All the control units are independent, but can be reconfigured in real time by a main control device that allows self-learning for adaptation to new environmental conditions.

Finally, the assembly can be mounted directly on the wall or in embedded form on a supporting mesh, which allows modularity for adaptation to various geometries.

The invention further relates to an acoustic panel covered with a set Nc of cells mainly constituted by a speaker, a set of Nm microphones linked to said speaker, and a control unit, said microphones and speaker being provided to be driven by said control unit, a fraction of the acoustic waves absorbed by the membrane of the speaker being converted into electrical energy to supply the set Nc of cells, the generalized acoustic impedance of each speaker being subject to a control law, so as to define locally at the surface of said panel an absorbing or reflecting behaviour, the panel further being connected to a main control device for driving the set of control units in a loop as detailed above.

BRIEF DESCRIPTION OF THE DRAWINGS

Other advantages and features of the invention will become apparent on reading the detailed description of implementations and embodiments that are in no way limitative and from the following attached drawings:

FIG. 1 This figure shows a diagrammatic view of an acoustic control device according to the invention.

FIG. 2 This figure shows a detail of an acoustic cell according to the invention.

DETAILED DESCRIPTION

Figure 3:
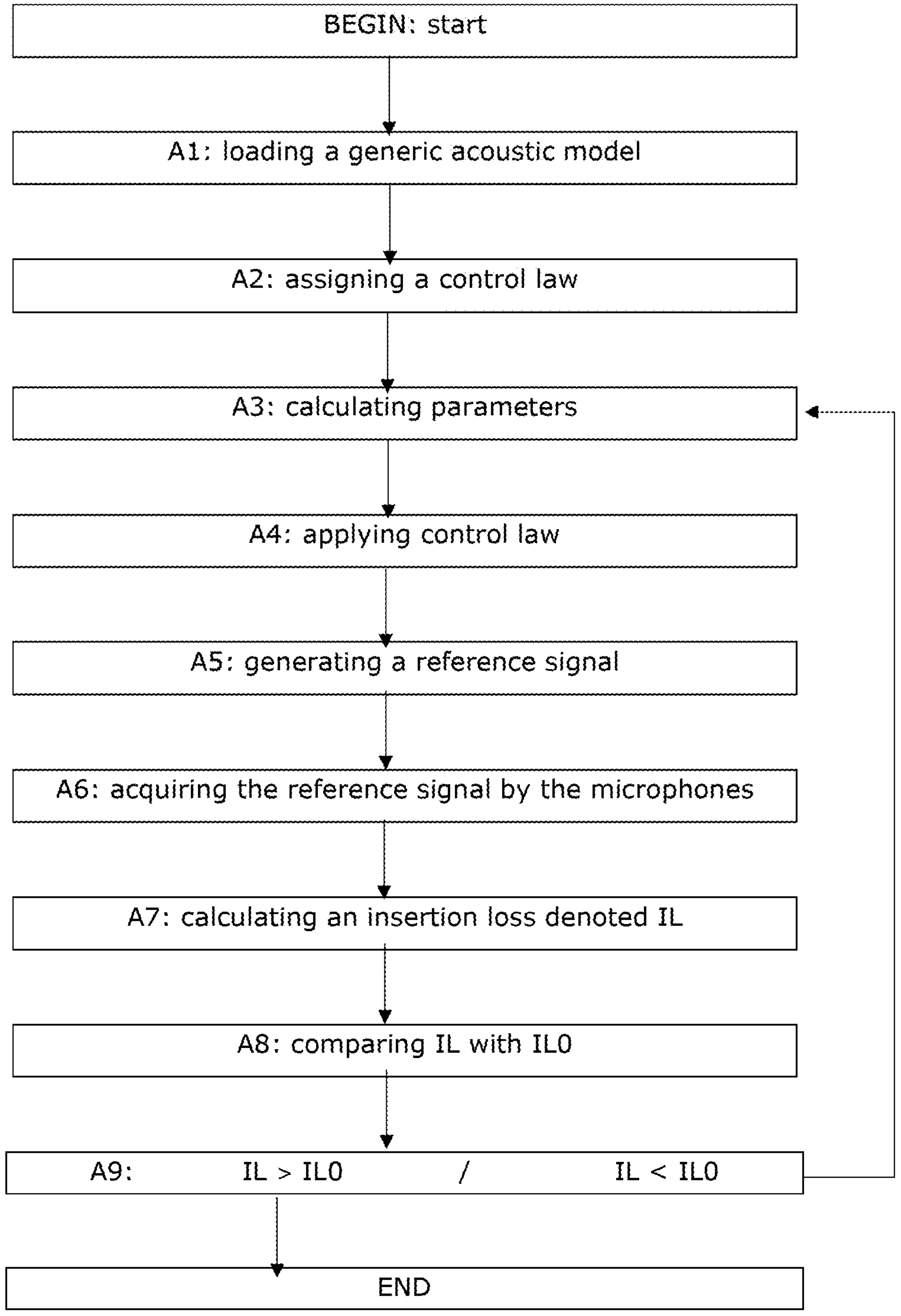
FIG. 3 This figure shows a schematic flow chart of the method according to the invention.

As the embodiments described hereinafter are in no way limitative, variants of the invention can be considered in particular comprising only a selection of the characteristics described, in isolation from the other characteristics described (even if this selection is isolated within a sentence comprising these other characteristics), if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

The device according to the invention is intended to convert an electroacoustic transducer into a polyvalent electroacoustic resonator making it possible to absorb sound energy in a space or even to contain this energy between two adjacent spaces without using detecting elements in order to achieve the desired noise reduction.

The technological innovation comprises in particular a modification of the internal dynamics of the electroacoustic transducer via a load electrical impedance connected to its terminals, adapted to the electroacoustic transducer used as well as to the acoustic dispersion conditions and the desired acoustic performance.

The role of this impedance is to adjust the losses, and to compensate the reactive parts of the transducer, with the intention of allowing it to exhibit performance that meets acoustic requirements.

The acoustic impedance exhibited by the membrane of the electroacoustic transducer to the surrounding sound field can thus be rendered transparent, absorbent or insulating to the incident sound waves, according to the transfer function performed by the load electrical impedance.

The synthesized electrical impedance constitutes the functional link between the voltage induced by the electroacoustic transducer subjected to an exogenous pressure field and the current necessary to absorb or contain the incident sound energy.

The invention concerns, among other things, an electroacoustic system permanently controlled in a self-adjusting closed loop, the control laws of which rely on prior knowledge of the internal model, i.e. the transduction mechanisms and the dissipative and reactive mechanisms inherent in the transducer mounted on an enclosure or a baffle.

With respect to the operating principle, a mobile part of the speaker (for example the membrane, the dust cap and the coil) is moved when it is subjected to an exogenous acoustic pressure field, oscillates back and forth along the axis of symmetry of the transducer, and is returned to an equilibrium position under the action of a spider and peripheral suspension elements. The movement of the coil, itself immersed in a magnetic field generated by a permanent magnet, creates an electromotive force, expressed by a voltage induced at the electrical terminals of the transducer.

This induced voltage is the image of the acoustic disturbance at the origin of the movement of the mobile part, but also depends on the internal dynamics of the speaker system and on the conditions of acoustic dispersion (enclosure, position in the room, etc.). It constitutes the input of the regulator, the role of which is to send a compensation electric current calculated to oppose a mechanical force at the membrane adapted to the desired acoustic effect: sound absorption in a space or sound insulation between two adjacent spaces.

Control of the generalized acoustic impedance, i.e. the dynamics of the relationship between the pressure, the pressure gradient and the velocity at the level of the controlled surface, results in a significant reduction in the energy transmitted along the treated surface.

This control is carried out by a distribution of speakers, which act on the velocity field, as well as by a distribution of microphones which allow measurement of the acoustic pressure field and its gradient.

It is therefore necessary to be able to impose the electric current flowing in the coil of the speakers, the amperage value being preferably calculated by an infinite impulse response filter (IIR), as a function of the measured acoustic pressure and of its gradient.

The developed device makes it possible to control N active cells of speakers simultaneously.

The architecture of the device also makes it possible to modify in real time the dynamics of each filter utilized.

Programming the generalized acoustic impedance imposed locally on the active surface affixed on the wall thus allows easy implementation of different control strategies.

Imposing a generalized acoustic impedance on a wall amounts to imposing the dynamics between the acoustic pressure, the acoustic pressure gradient and the velocity of the air at the level of this wall.

The development of such a control method and such a control device then makes it possible to produce a control loop having the signals of the microphones as input and as output the set point of the current that must be imposed in the coil of the speaker.

The passband of interest extends from 20 to 20000 Hertz, and in particular within the context of civil engineering applications, from 20 to 1500 Hertz.

In order to ensure a reduced bulk and to allow effective control within the envisaged frequency band, the wall can be subdivided into local control zones of five centimetres each side.

As shown in FIGS. 1 and 2, the device is constituted by Nc=12 identical independent cells 1 composed of a speaker 11, Nm microphones 10, an electronic signal conditioning card, a digital computation card and an electrical power supply, the whole representing the control unit 12.

Each cell includes between 3 and 5 microphones 10, preferably 4.

Each speaker 11 is controlled by the electrical power supply driven by a specifically developed digital computation card. The four microphones 10 of each cell 1 make it possible to estimate the average pressure at the centre of the membrane of each speaker. The pressure difference between the right and left boundary of the cell makes it possible to assess the spatial pressure gradient along the axis of propagation of the waves in the duct.

In terms of operation and with respect to FIG. 2, the device acquires the acoustic pressure by means of microphones 10.

After conditioning in a processing unit 13, the signals are digitized by an analogue-to-digital converter (ADC).

The average pressure at the centre of the membrane and/or the spatial derivative of the pressure at the level of the membrane is estimated based on the measurement of the microphones. The control law is then calculated by the computation unit 12.

The current set point originating from the calculation is generated by a digital-to-analogue converter (DAC).

Finally, a current source drives the current flowing in the speaker 11.

Referring now to FIG. 3, in greater detail, the control method according to the invention includes the following steps:

- a step in which a number Nc of cells 1 constituted mainly by a speaker 11 linked to a set of Nm microphones 10 is affixed on the wall, said microphones and speaker being provided to be driven by a control unit 12,
- a step in which each microphone 10 of each cell 1 measures the acoustic pressure of the acoustic waves, each measurement being returned to the cell control unit 12,
- a step in which the control unit 12 estimates the acoustic pressure at the level of the speaker and/or its spatial derivative, then determines the control law that sets the amperage of the electric signal that must be sent to the speaker 11 so as to obtain a determined acoustic impedance $Z_{det}$ for the speaker.

According to the invention, in this step the control unit estimates either the acoustic pressure at the level of the speaker, or its spatial derivative, or both.

Use of the spatial derivatives of the pressure advantageously makes it possible to take account of the rates of variation of the pressure field on the acoustic treatment wall and to take account of the effective velocities of propagation of the noise through the wall.

- a step in which the control unit 12 sends the electrical signal to the speaker 11, so that a fraction of the acoustic waves is absorbed by the membrane of the speaker, the remaining second fraction being reflected.

In certain applications, the calculation of the control laws is carried out locally at a frequency of 50 kHz by a microcontroller, preferably of the ARM type.

Advantageously, the fraction of the acoustic waves absorbed by the membrane of the speaker 11 is converted into electrical energy in order to supply each of the cells.

A main control device C equipped with an interface card advantageously makes it possible to communicate with the control unit 12 of each unitary cell from a graphical user interface.

The coefficients of the equations can then be determined and updated in real time, and the cells can be activated or deactivated separately.

This type of architecture makes it possible to implement locally control laws requiring dynamics that are different from one cell to another.

In addition, the main control device C can drive all of the control units 12, using a learning loop.

By way of example, the loop can include a first step "BEGIN" to initiate the process.

Then follows a step A1 in which a generic acoustic model is initiated, in the sense that any acoustic model may be suitable, and in the present case, it is in fact defined by the equation [Math3].

Then, in A2, a control law is assigned for at least one of the cells.

In A3, the parameters associated with the control laws are calculated.

In A4, the control law is applied to the cell.

In order to verify the suitability of the device constituted by the set of cells with regard to generalized impedance, a reference signal is generated in A5. This reference signal is in fact a "noise" initiated by the speaker or by an external element that is collected during step A6 by the microphones in order to initiate the control loop.

Step A6 allows the microphones to collect the signal.

Then in A7 the insertion loss (IL) must be calculated.

It is noted that insertion loss is a habitual known physical variable that corresponds to the reduction in the level of acoustic pressure, caused by the insertion of an acoustic control device in a duct in place of a section of duct with rigid walls.

In A8, the insertion loss (IL) is compared with a predetermined insertion loss value IL0, to verify if the insertion loss is greater than the minimum IL0 value corresponding to the desired generalized impedance $Z_{det}$.

In A9, the main control device C loops back to A3 to adapt the parameters of the control law in order to minimize the error on the measured impedance, in the event that IL<IL0.

Otherwise, the loop finishes with the command END.

Thus, in the event that the insertion loss IL is less than a minimum value, the main control device C relaunches the loop in order to refine the control laws.

This process is reiterated until the desired generalized impedance $Z_{det}$ is obtained.

It is possible to calibrate each of the cells at the same time, just as it is possible to calibrate the cells iteratively, i.e. one after another.

The control laws implemented are infinite impulse response filters (IIR).

The output of the filter depends both on the state of the inputs (pressure and pressure gradient) and outputs (current set point) at the moment t and at the preceding moments as a function of the filter order.

Calculation of the dynamics of the device is carried out by a microcontroller. This calculation take place in discrete time, at every sampling interval, in the form of a recurrent equation.

It is therefore necessary to establish this recurrent equation based on the expression of the transfer function representing the targeted dynamics.

The following equivalence relation d/dt=jω=p is used, which makes it possible to pass from the temporal representation to the harmonic frequency and Laplace representation.

The control law can thus be defined as follows:

The desired dynamics of the current amperage (i) is expressed with respect to the acoustic pressure (p) and its gradient (grad(p)), in the form of a summation of infinite impulse response filters (IIR), the dynamics of which is materialized by two transfer functions $H_{loc}$ and $H_{dis}$:

[Math 1]

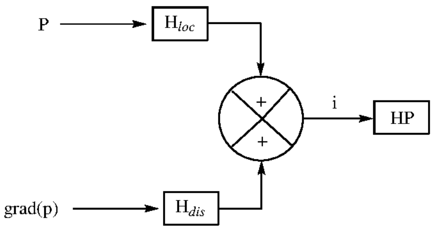

With $H_{loc}$ and $H_{dis}$ written in discrete time as a polynomial fraction in z:

$$H(z) = \frac{a_0 + a_1 z^{-1} + \ldots + a_n z^{-n}}{b_0 + b_1 z^{-1} + \ldots + b_m z^{-m}}$$ [Math 2]

With $(a_i, b_i)$ the real coefficients of the equation and (m, n) integers corresponding to the filter order.

The property according to which $z^{-1}$ is a pure delay of a sampling period produces the recurrent control equation between an output at the moment k ($y_k$) and an input at the moment k ($x_k$):

$$y_k = \frac{1}{a_0}\left[\sum_{i=1}^{m} b_i \cdot x_{k-i} - \sum_{j=1}^{n} a_j \cdot y_{k-j}\right]$$ [Math 3]

As the current driving signal in the coil of the speaker depends on the pressure and on its gradient, the complete control equation is written as the summation of two recurrent equations of the precedent form: $y_{tot}=y_{loc}+y_{dis}$.

With $y_{loc}$ dependent on the measured pressure and $y_{dis}$ dependent on the estimated pressure gradient.

The speakers are controlled by a current source based on operational amplifiers of 150 mA. The form utilized is an enhanced Howland source, stable in the case of inductive loads such as speakers.

Thus, each microphone (10) of each cell (1) measures the acoustic pressure of the acoustic waves. On this basis, this pressure measurement and the gradient of this pressure measurement are present in the equation $y_{tot}=y_{loc}+y_{dis}$.

with $y_{loc}$ dependent on the measured pressure and $y_{dis}$ dependent on the estimated pressure gradient.

$y_{loc}$ usually corresponds to the local value of the current at output, while $y_{dis}$ corresponds to the distributed value of the current at output.

Similarly, $x_{loc}$ usually corresponds to the local value of the current at input, while $x_{dis}$ corresponds to the distributed value of the current at input.

The pressure gradient is the quantity used in mechanics to represent pressure variation in a fluid (herein, air).

Equations [Math 2] and [Math 3] are equations that are conventional generic definitions of filtering techniques that make it possible to express with the equation [Math 1] the desired dynamics of the current amperage (i) with respect to the acoustic pressure (p) and its gradient (grad(p)), in the form of a summation of infinite impulse response filters.

Thus, the method and the device for electroacoustic control allow the implementation of a distributed control law based on an advection equation relating to attenuation of the oblique acoustic waves in a tube.

Thus, following an iterative procedure for each cell, the parameters of the control law are adapted while the value of the insertion loss is less than a predetermined threshold, then when the threshold is reached, step c) of claim 1 is carried out, which applies the appropriate control law (defined by adaptation of the parameters) with the aim of obtaining the determined (i.e. targeted) generalized acoustic impedance $Z_{det}$ for the speaker.

The advantages of the invention are as follows:

- the device can be programmed and the prioritized direction of the treatment can be modified,
- the device can be programmed in "self-learning" mode so as to define locally in real time the optimum acoustic behaviour,
- the device is modulable and can adopt several geometries,
- the device allows the synthesis of an acoustic diode (non-reciprocal wave propagation) and potentially its 2D extension,
- the device allows the measurement of the pressure fields of the wall in real time and therefore offers a source analysis capability,
- the device is more robust than the conventional control approaches as a result of the distributed character of the control units,
- the device has higher performance than other active systems, in terms of pure efficiency and energy consumption.

It should be noted that the different characteristics, forms, variants and embodiments of the invention can be combined together in various combinations to the extent that they are not incompatible or mutually exclusive.

Of course, following an iterative process for each cell, it is also possible to adapt the parameters of the control law while the value of a reference physical variable, other than the insertion loss (for example the transmission loss, an absorption coefficient or a target impedance), is sufficiently close to a predetermined value.

The invention claimed is:

1. A method for controlling the propagation of acoustic waves in the vicinity of a wall, the method comprising:

- a step a) in which a number Nc of cells, Nc>1, is affixed on the wall, each cell including a set of Nm microphones, a control unit, a power supply, and a speaker linked to said set of Nm microphones, said set of Nm microphones and speaker for each said cell being driven by said control unit, a power supply;
- a step b) in which each said Nm microphone of each cell measures the acoustic pressure of the acoustic waves, each measurement being returned to the cell control unit;
- a step c) in which the control unit estimates the acoustic pressure and/or its tangential spatial derivatives at the speaker, then applies a control law that sets the amperage of an electrical signal that must be sent to the speaker so as to obtain a determined generalized acoustic impedance $Z_{det}$ for the speaker; and a step d) in which the control unit sends the electrical signal to the speaker, so that a fraction of the acoustic waves is absorbed by a membrane of the speaker, a main control device (C) driving each said control unit in each said cell, using a learning loop so as to adjust the determined generalized acoustic impedance $Z_{det}$ for each cell, said loop including the following steps:

BEGIN: start

A1: loading a generic acoustic model

A2: assigning a control law to at least one of the cells

A3: calculating parameters associated with the control law

A4: applying the control law of step A2 to each said cell

A5: generating a reference signal

A6: acquiring the reference signal by the microphones

A7: calculating an insertion loss denoted IL

A8: comparing the calculated insertion loss denoted IL with a predetermined insertion loss value IL0 corresponding to obtaining a determined generalized acoustic impedance $Z_{det}$ A9: return to A3 for adaptation of the parameters of the control law in order to minimize an error on a measured impedance, in the event that IL is less than IL0, otherwise, the loop finishes with END.

2. The method for controlling the propagation of acoustic waves according to claim 1, characterized in that each cell includes between 3 and 5 microphones.

3. The method for controlling the propagation of acoustic waves according to claim 1, characterized in that the fraction of the acoustic waves absorbed by the membrane of the speaker is converted into electrical energy dedicated to supplying each of the cells.

4. The method for controlling the propagation of acoustic waves according to claim 1, characterized in that the generalized acoustic impedance $Z_{det}$ is modified by means of the control law that sets the amperage of the electric current that must be sent to the speaker, and defined as follows:

the desired dynamics of the current amperage (i) is expressed with respect to the acoustic pressure (p) and its gradient (grad (p)), in the form of a summation of infinite impulse response filters denoted IIR, the dynamics of which is materialized by two transfer functions $H_{loc}$ and $H_{dis}$.

5. The method for controlling the propagation of acoustic waves according to claim 1, characterized in that the control unit is a microcontroller.

6. The method for controlling the propagation of acoustic waves according to claim 1, characterized in that the control law is defined at a frequency comprised between 50 and 150 KHz.

7. A device for controlling the propagation of acoustic waves in the vicinity of a wall, comprising: a set Nc of cells, Nc>1, each said cell constituted by a speaker; a set of Nm microphones linked to said speaker; a control unit; and a power supply; said microphones and speaker in each said cell being provided to be driven by said control unit; a fraction of the acoustic waves absorbed by the membrane of the speaker being converted into electrical energy to supply the set Nc of cells; each said microphone of each said cell being capable of measuring the acoustic pressure of the acoustic waves; each measurement being returned to the cell control unit, the control unit being capable of estimating the acoustic pressure and its tangential spatial derivatives at the speaker, and capable of applying a control law that sets an amperage of an electrical signal that must be sent to the speaker so as to obtain a determined generalized acoustic impedance $Z_{det}$ for the speaker, the device also including a main control device (C) for driving the control units in a loop including the following steps:

BEGIN: start

A1: loading a generic acoustic model

A2: assigning a control law to at least one of the cells

A3: calculating the parameters associated with the control law

A4: applying the control law of step A2 to each said cell

A5: generating a reference signal

A6: acquiring the reference signal by the microphones

A7: calculating an insertion loss denoted IL

A8: comparing the insertion loss denoted IL with a predetermined insertion loss value IL0 corresponding to obtaining a desired generalized acoustic impedance $Z_{det}$ A9: return to A3 for adaptation of the parameters of the control law in order to minimize an error on the measured impedance, in the event that IL is less than IL0.

8. The device for controlling the propagation of acoustic waves in the vicinity of a wall according to claim 7, characterized in that each cell includes between 3 and 5 microphones.

9. An acoustic panel incorporating a device according to claim 7, covered with a set Nc of cells, Nc>1, each cell including a speaker; a set of Nm microphones linked to said speaker; and a control unit; said microphones and speaker being provided to be driven by said control unit; a fraction of the acoustic waves absorbed by the membrane of the speaker being converted into electrical energy to supply the set Nc of cells; the generalized acoustic impedance of each speaker being subject to a control law, so as to define locally to the surface of said panel the absorbing or reflecting behaviour; the panel being connected to a main control device (C) for driving the set of control units.

* * * * *